United States Patent
Belansky et al.

(10) Patent No.: US 9,191,112 B2
(45) Date of Patent: Nov. 17, 2015

(54) ANALOG OPTICAL FIBER-BASED SIGNAL DISTRIBUTION SYSTEM AND METHOD

(71) Applicant: Raytheon Company, Waltham, MA (US)

(72) Inventors: Richard H. Belansky, Yorba Linda, CA (US); Cecil Vergel De Dios, Torrance, CA (US); Andrew R. Rollinger, Newbury Park, CA (US)

(73) Assignee: Raytheon Company, Waltham, MA (US)

( * ) Notice: Subject to any disclaimer, the term of this patent is extended or adjusted under 35 U.S.C. 154(b) by 115 days.

(21) Appl. No.: 13/960,911

(22) Filed: Aug. 7, 2013

(65) Prior Publication Data

US 2015/0043923 A1    Feb. 12, 2015

(51) Int. Cl.
| | |
|---|---|
| *H04B 10/12* | (2006.01) |
| *H04B 10/00* | (2013.01) |
| *H04B 10/2575* | (2013.01) |
| *H04B 10/2507* | (2013.01) |
| *G06F 1/10* | (2006.01) |
| *H04B 10/25* | (2013.01) |

(52) U.S. Cl.
CPC ............ *H04B 10/2575* (2013.01); *G06F 1/105* (2013.01); *H04B 10/25* (2013.01); *H04B 10/2507* (2013.01)

(58) Field of Classification Search
None
See application file for complete search history.

(56) References Cited

U.S. PATENT DOCUMENTS

| | | | | |
|---|---|---|---|---|
| 4,837,556 | A | * | 6/1989 | Matsushita et al. .......... 369/47.1 |
| 4,916,460 | A | * | 4/1990 | Powell .......................... 343/853 |
| 5,361,277 | A | | 11/1994 | Grover |
| 5,442,475 | A | | 8/1995 | Bausman et al. |
| 5,537,498 | A | | 7/1996 | Bausman et al. |
| 6,111,678 | A | * | 8/2000 | Mathoorasing et al. ...... 398/147 |
| 7,024,121 | B2 | | 4/2006 | Rikitake et al. |
| 7,668,153 | B2 | | 2/2010 | Zavadsky |

(Continued)

FOREIGN PATENT DOCUMENTS

WO    WO-2015021017 A1    2/2015

OTHER PUBLICATIONS

Sinclair et al., Electronic and Electrical Servicing: Consumer and Commercial Electronics, 2007, Elsevier Limited, 2nd ed., pp. 142-144.*

(Continued)

*Primary Examiner* — Ken Vanderpuye
*Assistant Examiner* — Jai Lee
(74) *Attorney, Agent, or Firm* — Schwegman Lundberg & Woessner, P.A.

(57) ABSTRACT

In an analog, fiber-based signal distribution system, a periodic electrical signal is frequency-multiplied by a factor of N, is converted to an optical signal, is optically amplified, is split among one or more optical fibers, is delivered by fiber to one or more remote units, is converted back to an electrical signal, is frequency-divided by the factor of N back to its original frequency, and can be used to generate synchronized clock signals at the remote units. The optical amplifier imparts a phase noise that is relatively independent of frequency, so that the phase noise contribution from the optical amplifier is advantageously decreased when the frequency divider reduces the frequency of the electrical signal. Compared to a distribution system that does not increase, then decrease, the frequency by a factor of N, the phase noise contribution from the optical amplifier is reduced by 20 log 10(N).

20 Claims, 4 Drawing Sheets

(56) References Cited

U.S. PATENT DOCUMENTS

| | | | | |
|---|---|---|---|---|
| 2008/0273460 | A1* | 11/2008 | Lamothe et al. | 370/231 |
| 2009/0232507 | A1* | 9/2009 | Gupta et al. | 398/115 |
| 2012/0230694 | A1* | 9/2012 | Tanaka et al. | 398/79 |
| 2012/0243874 | A1* | 9/2012 | Logan et al. | 398/116 |

OTHER PUBLICATIONS

Elliott, Rod, http://sound.westhost.com/appnotes/an005.htm, 2005.*
Ramaswami et al., Optical Networks: a practical Perspective, 2010, Elsevier Inc., 3rd Ed., pp. 33-34, 49, 192-195.*
"International Application Serial No. PCT/US2014/049727, International Search Report mailed Dec. 2, 2014", 4 pgs.
"International Application Serial No. PCT/US2014/049727, Written Opinion mailed Dec. 2, 2014", 6 pgs.
Currie, Marc, "High-Performance Photonic Analog-to-Digital Converter and Low-Noise Mode-Locked Fiber Lasers", *Final Report, Naval Research Laboratory*, Washington, D.C., (Apr. 2003), 1-86.
Daryoush, Afshin S., et al., "Fiber Optic Distribution Networks for Military Applications", *Optics Microwave Interactions, Defense Technical Information Center*, (2003), 7-1-7-16.
Juodawlkis, Paul W., et al., "Measurement of mode-locked laser timing jitter by use of phase-encoded optical sampling", *Optics Letters*, 26(5), (2001), 289-291.
Lutes, George, "Reference Frequency Distribution Over Optical Fibers: A Progress Report", *41st Annual Frequency Control Symposium*, (1987), 161-166.
Thomas, Cecil, et al., "Analysis of Phase noise of RF signals in Analog Fiber Optic Systems", *IEEE Sarnoff Symposium*, (2006), 1-6.
Winter, Axel, et al., "Phase Noise Characteristics of Fiber Lasers as Potential Ultra-Stable Master Oscillators", *Proceedings of 2005 Particle Accelerator Conference*, Knoxville, Tennessee, (2005), 2521-2523.
Yap, Daniel, et al., "RF-Photonic Links for Local-Oscillator Distribution and Frequency Conversion", *IEEE International Conference on Phased Array Systems and Technology*, (2000), 371-374.

* cited by examiner

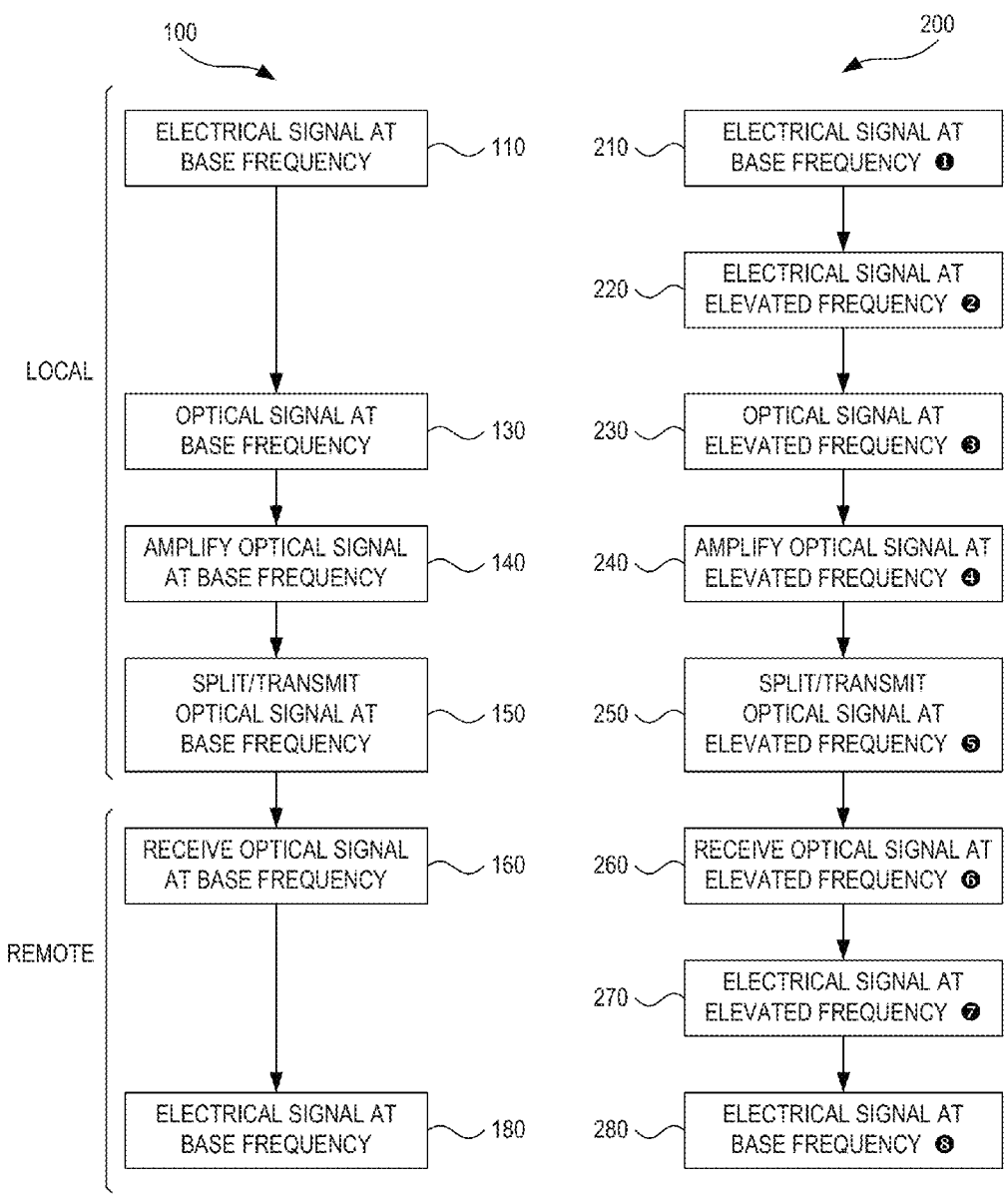

US 9,191,112 B2

ANALOG OPTICAL FIBER-BASED SIGNAL DISTRIBUTION SYSTEM AND METHOD

STATEMENT REGARDING FEDERALLY SPONSORED RESEARCH OR DEVELOPMENT

This invention was made with government support under a contract awarded by the United States Department of Defense. The contract number is withheld by the United States Department of Defense. The government has certain rights in the invention.

TECHNICAL FIELD

Examples pertain to systems and methods in which an analog electrical signal, such as a pure sinewave, is converted to an analog optical signal, is sent via optical fiber to one or more remote units, and is converted back to an analog electrical signal by each remote unit.

BACKGROUND

Analog fiber optic links are commonly used to deliver analog signals by optical fiber to remote units. The analog signals can be periodic, such as sinewaves, which can be used to generate clock signals at the remote units. If the optical fibers are split from a common optical source, the clock signals can be synchronized to each other.

FIG. 1 shows a known method 100 for using a fiber optic link in a system to distribute an analog signal. At 110, the system generates or receives a periodic electrical signal. At 130, the system converts the electrical signal to an optical signal. At 140, the system amplifies the optical signal. At 150, the system splits the amplified optical signal into several optical signals and transmits the optical signals into respective optical fibers. The optical fibers extend from a local unit to various remote units. At 160, a remote unit receives the respective optical signal from the respective optical fiber. At 180, the remote unit converts the received optical signal back to an electrical signal. The electrical signal at 180 is intended to resemble the periodic electrical signal at 110, so that a zero-crossing of the signal at 110 occurs at the same time as a corresponding zero-crossing of the signal at 180. The electrical and optical signals in method 100 are all periodic, and all have the same frequency.

In practice, there are various random noise sources in the system that can affect the signal. The addition of this random noise to the signal can shift the zero-crossings of the signal at 180 so that some occur slightly too early and some occur slightly too late. If the zero-crossings of the signal at 180 are used to generate a clock signal for an analog-to-digital converter, the random noise can produce timing errors in the clock signal, which in turn adds jitter to the measurement. In general, it is desirable to reduce the noise sources wherever possible, in order to keep jitter to a minimum or a tolerably small value.

SUMMARY

In an analog, fiber-based signal distribution system, a periodic electrical signal is frequency-multiplied by a factor of N, is converted to an optical signal, is optically amplified, is split among one or more optical fibers, is delivered by fiber to one or more remote units, is converted back to an electrical signal, is frequency-divided by the factor of N back to its original frequency, and can be used to generate synchronized clock signals at the remote units. The optical amplifier imparts a phase noise that is relatively independent of frequency, so that the phase noise contribution from the optical amplifier is advantageously decreased when the frequency divider reduces the frequency of the electrical signal. Compared to a distribution system that does not increase, then decrease, the frequency by a factor of N, such as the known system described by the method 100 of FIG. 1, the phase noise contribution from the optical amplifier is reduced by 20 log 10(N).

In one example of an analog, fiber-based signal distribution system, a frequency multiplier is configured to receive a first periodic electrical signal at a base frequency and convert the first periodic electrical signal to a second periodic electrical signal at an elevated frequency greater than the base frequency. An optical source is configured to convert the second periodic electrical signal to a third periodic optical signal at the elevated frequency. An optical amplifier is configured to amplify the third periodic optical signal to produce a fourth periodic optical signal at the elevated frequency. An optical fiber is configured to receive the fourth periodic optical signal and direct a respective sixth periodic optical signal to a remote unit. The remote unit includes an optical detector configured to receive the sixth periodic optical signal at the elevated frequency and produce a seventh periodic electrical signal at the elevated frequency. The remote unit also includes a frequency divider configured to receive the seventh periodic electrical signal at the elevated frequency and produce an eighth periodic electrical signal at the base frequency.

In another example of a signal remote distribution system, a frequency multiplier is configured to receive a first periodic electrical signal at a base frequency and convert the first periodic electrical signal to a second periodic electrical signal at an elevated frequency greater than the base frequency. An optical source is configured to convert the second periodic electrical signal to a third periodic optical signal at the elevated frequency. An optical amplifier is configured to amplify the third periodic optical signal to produce a fourth periodic optical signal at the elevated frequency. An optical splitter configured to split the fourth periodic optical signal into a plurality of fifth periodic optical signals. The system includes a plurality of optical fibers. Each optical fiber is configured to receive a respective fifth periodic optical signal and direct a respective sixth periodic optical signal to a respective remote unit. Each remote unit includes an optical detector configured to convert the sixth periodic optical signal to a seventh periodic electrical signal at the elevated frequency. Each remote unit also includes a frequency divider configured to receive the seventh periodic electrical signal at the elevated frequency and produce an eighth periodic electrical signal at the base frequency. The eighth periodic signals of the remote units are all synchronized.

In an example of a method for transmitting a signal, a first periodic electrical signal is generated at a base frequency. The frequency of the first periodic electrical signal is increased to an elevated frequency to form a second periodic electrical signal. The second periodic electrical signal at the elevated frequency is converted to a third periodic optical signal at the elevated frequency. The third periodic optical signal at the elevated frequency is amplified to form a fourth periodic optical signal at the elevated frequency. The fourth periodic optical signal at the elevated frequency is transmitted via an optical fiber to form a fifth periodic optical signal at the elevated frequency. The fifth periodic optical signal at the elevated frequency is received to form a sixth periodic optical signal at the elevated frequency. The sixth periodic optical signal at the elevated frequency is converted to a seventh periodic electrical signal at the elevated frequency. The frequency of the seventh periodic electrical signal is reduced to the base frequency to form an eighth periodic electrical signal.

This summary is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 is a flow chart of a known method for using a fiber optic link to distribute an analog signal.

FIG. 2 is a flow chart of a method for using a fiber optic link to distribute an analog signal.

DETAILED DESCRIPTION

Figure 3:
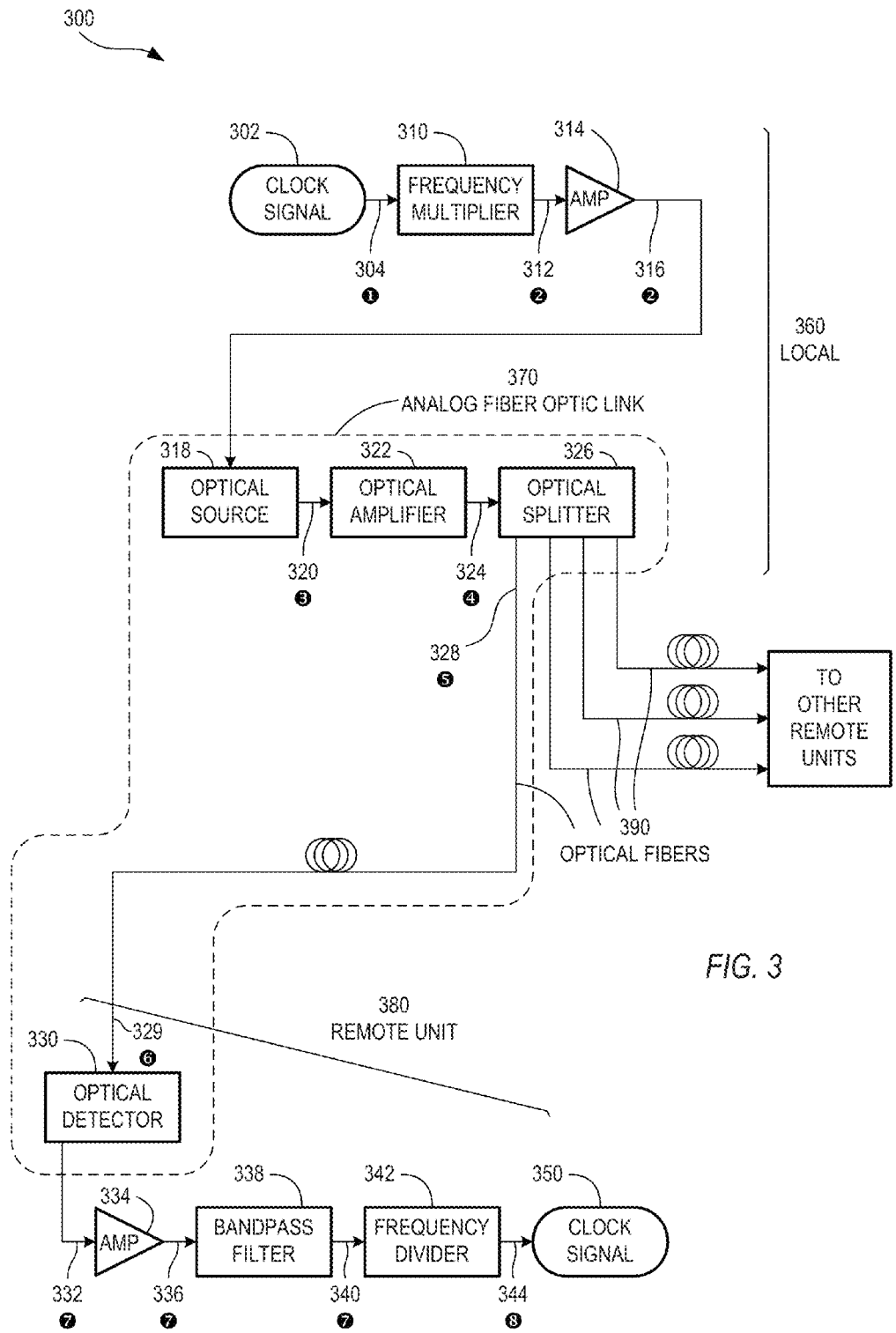
FIG. 3 is a schematic drawing of an example of an analog, fiber-based signal distribution system that uses the method of FIG. 2.

FIG. 2 shows an example method 200 for using a fiber optic link in a system to distribute an analog signal, which is advantageous over the known method 100 in FIG. 1. The method includes a total of eight periodic signals, which are numbered for convenience in the text below as first, second, third, and so forth. The periodic signals are also identified in the figures by corresponding circled numerals one through eight. For instance, the sixth periodic signal is consistently identified by the circled numeral six in the figures. The numbers themselves have no significance beyond convenience.

At 210, at a local unit, the system generates or receives a first periodic electrical signal at a base frequency. At 220, the system increases the frequency of the first periodic electrical signal to an elevated frequency to form a second periodic electrical signal. The frequency can be increased by a factor of two, three, four, five, six, seven, eight, more than eight, any suitable integer value, or any suitable value greater than one. At 230, the system converts the second periodic electrical signal at the elevated frequency to a third periodic optical signal at the elevated frequency. At 240, the system amplifies the third periodic optical signal at the elevated frequency to form a fourth periodic optical signal at the elevated frequency. This amplification is performed by an optical amplifier, such as an erbium-doped fiber amplifier. At 250, the system splits and transmits via optical fiber the fourth periodic optical signal at the elevated frequency to form a fifth periodic optical signal at the elevated frequency. Optical fibers can extend from the local unit to various remote units. At 260, a remote unit receives the fifth periodic optical signal at the elevated frequency to form a sixth periodic optical signal at the elevated frequency. At 270, the remote unit converts the sixth periodic optical signal at the elevated frequency to a seventh periodic electrical signal at the elevated frequency. At 280, the remote unit reduces the frequency of the seventh periodic electrical signal to the base frequency to form an eighth periodic electrical signal.

Compared with the known method 100, the method 200 of FIG. 2 elevates the frequency of the periodic signal prior to conversion to an optical signal, then reduces it back to its original frequency after conversion back to an electrical signal. This change in frequency reduces the effect of noise that arises during the optical amplification step 240.

For electrical frequency multipliers and dividers, it is known that changing the frequency of a periodic electrical signal also changes the residual, single-sideband (SSB) phase noise of the signal. If the frequency is multiplied (increased) by a factor of N, the SSB phase noise increases by N in a linear scale, or, equivalently, increases by 20 log 10(N) dB in a logarithmic scale. Similarly, if the frequency is divided (decreased) by a factor of N, the SSB phase noise decreases by N in a linear scale, or, equivalently, decreases the SSB phase noise by 20 log 10(N) dB in a logarithmic scale. These scalings of the SSB phase noise with frequency are an inherent property of electrical frequency multipliers and dividers.

If there were no noise generated by the optical amplifier at step 240 in FIG. 2, then the noise from the electrical signal at step 210 would scale up when the frequency is elevated at step 220, then would scale back down to its original level at step 280 when the frequency is reduced, and the SSB phase noise present in the output of method 200 would be roughly the same as for known method 100. However, the optical amplifier does generate noise, and the noise generated by the optical amplifier is scaled downward at step 280. Compared with the known method 100 of FIG. 1, in which noise generated by the optical amplifier is not scaled downward, the method 200 has less SSB phase noise, and, therefore, has an improved performance.

The two largest noise sources that arise during optical amplification are from amplified spontaneous emission (ASE) from the optical amplifier, such as an erbium doped fiber amplifier, and relative intensity noise (RIN) from the light source, such as a laser. For optical signals that vary periodically at a carrier frequency, ASE and RIN produce spectral noise at frequencies relatively close to the carrier frequency. This noise is commonly referred to as close-in noise. ASE and RIN do not have significant noise contributions far away from the carrier frequency, such as greater than a factor of two larger than the carrier frequency or less than a factor of one-half smaller than the carrier frequency. As a result, the SSB phase noise contributions of the optical amplifier are the same for the base frequency, as in step 140 of the known method 100 of FIG. 1, and for the elevated frequency, as in step 240 of the method 200 of FIG. 2. In the known method 100, where the frequency of the electrical signals are constant throughout the method, the SSB phase noise arising from the optical amplifier is unattenuated. In contrast, in the method 200 of FIG. 2, where the frequency of the electrical signal is reduced by a factor of N at step 280, the SSB phase noise arising from the optical amplifier is reduced by 20 log 10(N) dB. This reduction in SSB phase noise provides an improved performance over the known method 100.

FIG. 3 is a schematic drawing of an example of an analog, fiber-based signal distribution system 300 that uses the method 200 of FIG. 2. The system 300 generates or receives a clock signal 302 in a local unit 360, distributes the clock signal via analog fiber optic links 370 to several remote units 380, and reconstructs the clock signal 350 at each remote unit. The clock signals 350 are all synchronized, so that a particular zero-crossing in the clock signal occurs at the same time for all the remote units 380. The reconstructed clock signal 350 can be used to control an external device, such as an analog-to-digital converter.

The clock signal 302 is a periodic signal, such as a sinewave or a series of pulses, with a base frequency. Such a sinewave is taken to be purely sinusoidal, in that it does not include any non-periodic information or signal. The system 300 can generate the clock signal 302, or the system 300 can receive the clock signal 302 from an external device. The first periodic electrical signal 304 at the base frequency is the clock signal 302.

A frequency multiplier 310 receives the signal 304 and increases the frequency from the base frequency to an elevated frequency. The increase can be by a factor of N, where N is greater than one and can be an integer greater than one. The frequency multiplier produces a second periodic electrical signal 312 at the elevated frequency. As noted above, the frequency multiplier increases the SSB phase noise by 20 log 10(N) dB, so that the SSB phase noise of signal 312 is 20 log 10(N) dB greater than that of signal 304.

An RF amplifier 314 increases the amplitude of signal 312 without significantly affecting the frequency, the phase, or the noise of the signal 312. The RF amplifier 314 produces an amplified signal 316, which has essentially the same frequency, phase, and noise as the second periodic electrical signal 312.

An optical source 318 converts the electrical signal 316 into an optical signal 320. The optical source 318 can include a semiconductor laser, such as a laser diode. In some examples, the laser has a wavelength between 1525 nm and 1565 nm. Other suitable wavelength ranges can also be used, such as 1260 nm to 1360 nm. In some examples, the system 300 can modulate the laser directly, and can switch the laser intensity between a low value and a high value periodically in response to the electrical signal 316. In other examples, the system 300 can keep the laser intensity constant or relatively constant, and direct the electrical signal 316 into an external modulator, such as a Mach-Zehnder Intensity Modulator. The optical signal 320 oscillates between relatively low and relatively high intensity levels without ever dropping to zero; an effective zero-crossing can be obtained by noting the times at which the signal crosses the midpoint between the relatively low and relatively high levels. The output of the optical source 318 is a third periodic optical signal 320 at the elevated frequency.

An optical amplifier 322 increases the amplitude of signal 320 without significantly affecting the frequency or the phase of the signal 320. A suitable optical amplifier 322 can include an erbium-doped fiber amplifier, which is particularly well-suited to operate in the wavelength range of 1525 nm to 1565 nm. Other suitable optical amplifiers can also be used, such as a praseodymium-doped fiber amplifier, which is well-suited to operate in the wavelength range around 1300 nm, or a solid-state optical amplifier (SOA). The optical amplifier 322 produces a fourth periodic optical signal 324 at the elevated frequency. As noted above, the optical amplifier 322 increases the SSB phase noise of the amplified signal, so that the SSB phase noise of signal 324 is greater than that of signal 320.

An optical splitter 326 splits the amplified signal 324 into several signals, where the signals produced by the splitter are all synchronized in phase to one other. The optical splitter 326 produces several fifth periodic optical signals 328 at the elevated frequency.

The optical splitter 326 directs the signals 328 into respective optical fibers 390. Each fiber 390 extends away from the local unit 360 toward a respective remote unit 380. The structure and function of the remote units 380 can be essentially the same, so that the description below of one remote unit 380 also applies to the other remote units 380.

The optical fiber 390 receives the signal 328 from the splitter, and delivers the signal as a sixth periodic optical signal 329 to respective remote unit 380. Signals 328 and 329 both have the same frequency, phase, and essentially the same noise. The amplitude of signal 329 may be slightly smaller than that of signal 328, due to a small amount of loss in the optical fiber 390.

An optical detector 330 converts optical signal 329 into an electrical signal 332. A suitable detector can include a photodetector that is sensitive in the wavelength range of the optical source 318, such as the wavelength range of 1525 nm to 1565 nm. The output of the optical detector 330 is a seventh periodic electrical signal 332 at the elevated frequency.

An RF amplifier 334 increases the amplitude of signal 332 without significantly affecting the frequency, the phase, or the noise of the signal 332. The RF amplifier 334 produces an amplified signal 336, which has essentially the same frequency, phase, and noise as the signal 332 from the optical detector 330.

An optional bandpass filter 338 limits the frequency of signal 336 to a region around the elevated frequency. Such a bandpass filter can remove or reduce unwanted harmonics, and can also eliminate or reduce noise at the harmonics. The bandpass filter 338 produces output signal 340, which has the same frequency and phase as signal 336.

A frequency divider 342 receives the signal 340 and divides the frequency from the elevated frequency to the base frequency. The decrease is by the factor of N, which is the same factor used in the frequency multiplier 310. The frequency divider produces an eighth periodic electrical signal 344 at the base frequency. As noted above, the frequency divider decreases the SSB phase noise by 20 log 10(N) dB, so that the SSB phase noise of signal 344 is 20 log 10(N) dB less than that of signal 340. The frequency divider also reduces the SSB phase noise caused by the optical amplifier 322 by a factor of 20 log 10(N) dB. In some examples, the locations in the circuitry of the bandpass filter and the frequency divider may be switched.

The signal 344 can be used as a clock signal 350, or can be used to trigger a clock signal 350. The clock signal 350 is intended to reproduce the clock signal 302, and is intended to synchronize with the reproduced clock signals of the other remote units 380.

The analog fiber optic link 370 includes the optical source 318, the optical amplifier 322, and the optical splitter 326, all located at the local unit 360, the optical detector 330 located at the remote unit 380, and the optical fiber 390 extending between the optical splitter 326 and the optical detector 330. The analog fiber optic link 370 receives electrical signal 316 as its input, and provides electrical signal 332 as its output. The output electrical signal 332 has the same frequency and phase of the input electrical signal 316, but has additional SSB phase noise caused by the optical amplifier 322.

Figure 4:
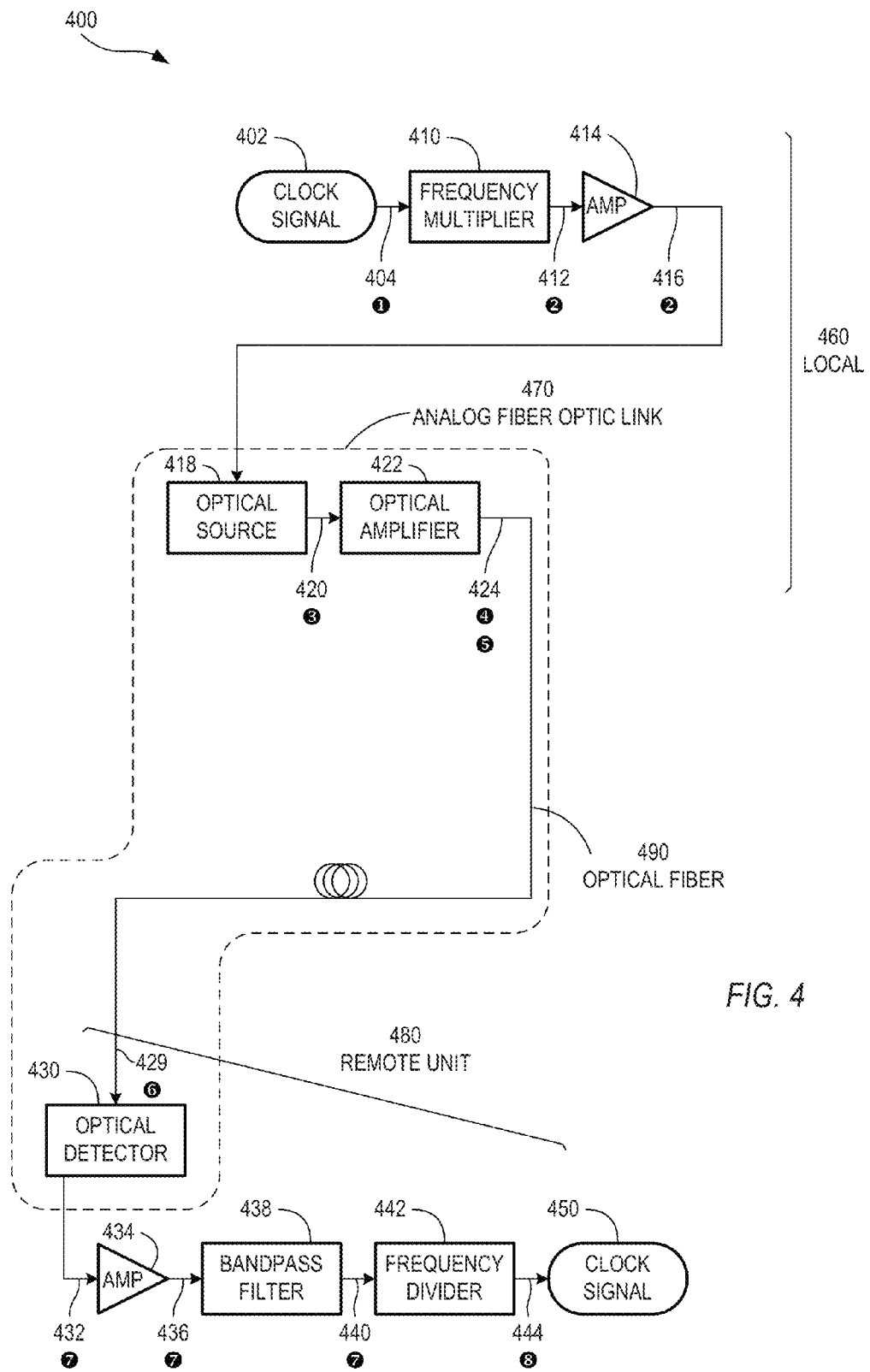
FIG. 4 is a schematic drawing of another example of an analog, fiber-based signal distribution system that uses the method of FIG. 2.

FIG. 4 is a schematic drawing of another example of an analog, fiber-based signal distribution system 400 that uses the method 200 of FIG. 2. Elements numbered as 4xx in FIG. 4 have the same function and structure as corresponding elements numbered as 3xx in FIG. 3. One difference between systems 300 and 400 is that the system of FIG. 4 omits the splitter and uses only a single remote unit 480. For the system 400 of FIG. 4, the optical amplifier 422 produces signal 424, and sends signal 424 directly into an optical fiber 490 for transmission to the remote unit 480.

The systems 300, 400 of FIGS. 3 and 4 are examples of systems that use the method 200 of FIG. 2 to reduce SSB phase noise from the optical amplifier. Other suitable systems may also be used. For each of these examples, an electrical signal is frequency multiplied by a factor of N from a base frequency to an elevated frequency, is converted to an optical signal, is optically amplified at the elevated frequency, is converted back to an electrical signal, and is frequency divided by N back to the base frequency. The frequency division reduces the SSB phase noise contributed by the optical amplifier by N in a linear scale, or, equivalently, decreases the SSB phase noise by 20 log 10(N) dB in a logarithmic scale.

Figure 5:
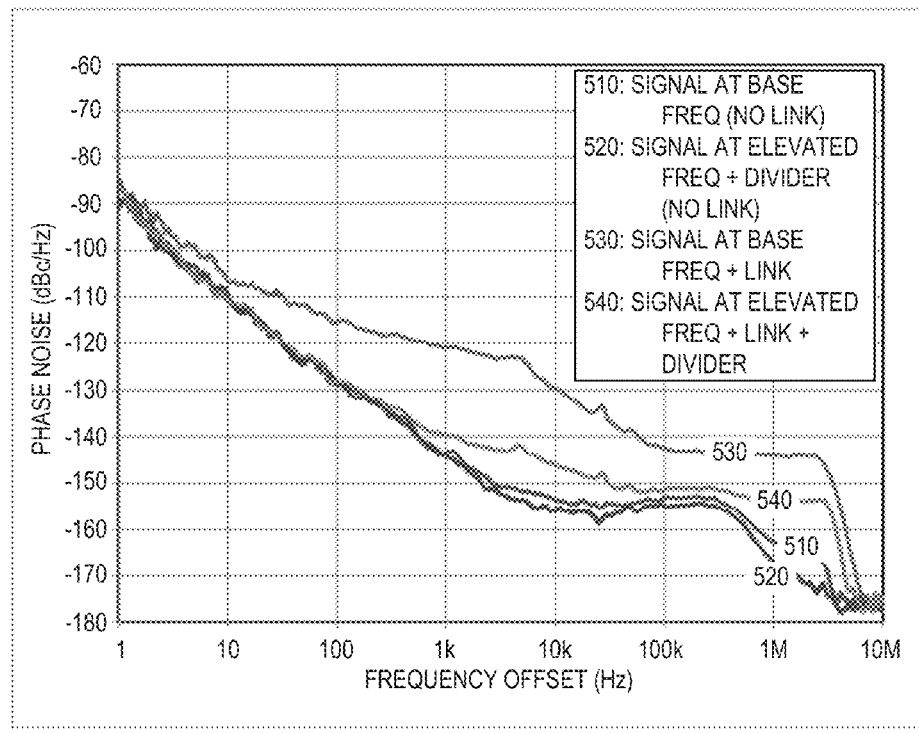
FIG. 5 shows plots of phase noise for various configurations of components from the systems of FIGS. 3 and 4.

FIG. 5 shows examples of phase noise, obtained experimentally, for various combinations of components. The curves show the effect of the optical link for a system that increases the frequency before the optical amplification and lowers it afterward (as in FIG. 2), and compares it with a system that uses the same base frequency throughout (as in FIG. 1). For this experimental system, the base frequency was 125 MHz, and the elevated frequency was 500 MHz. The phase noise is plotted in unit of dBc/Hz, and the frequency is plotted on a logarithmic axis from 1 Hz to 10 MHz.

Curve 510 includes only a signal generator operating at a baseline frequency of 125 MHz. Curve 510 may be considered an "input" noise for the known method 100 of FIG. 1, in which the optical amplification is performed at the base frequency.

Curve 530 includes the signal generator operating at a baseline frequency of 125 MHz, plus an optical link. Curve 530 may be considered an "output" noise for the known method 100 of FIG. 1. FIG. 5 shows that the output noise, 530, is significantly higher than the input noise, 510, for the known method 100 of FIG. 1, in which the optical amplification is performed at the base frequency.

Curve 520 includes a signal generator operating at an elevated frequency of 500 MHz, plus a divider that lowers the frequency to 125 MHz. Curve 520 may be considered an "input" for the method 200 of FIG. 2, in which the frequency is raised, then lowered. Curve 520 includes noise only from the signal generator; the small difference between curves 520 and 510 shows that the signal generator has slightly less noise when operating at 500 MHz, compared to 125 MHz.

Curve 540 includes the signal generator operating at an elevated frequency of 500 MHz, plus an optical link, plus a divider that lowers the frequency to 125 MHz. Curve 540 may be considered an "output" noise for the method 200 of FIG. 2. FIG. 5 shows that the output noise, 540, is higher than the input noise, 520, for the method 200 of FIG. 2, in which the optical amplification is performed at the elevated frequency.

Importantly, FIG. 5 shows that the output noise, 540, for the method 200 of FIG. 2 is significantly less than the output noise, 530, for the known method 100 of FIG. 1. The curves 510, 520, 530, 540 in FIG. 5 were obtained experimentally for a base frequency of 125 MHz, an elevated frequency of 500 MHz, and a multiplicative factor of 4. Other base frequencies, elevated frequencies, and multiplicative factors may also be used.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, systems 300, 400 may include one or more processors and may be configured with instructions stored on a computer-readable storage device.

What is claimed is:

1. An analog, fiber-based signal distribution system, comprising:
    a frequency multiplier configured to receive a first periodic electrical signal at a base frequency and convert the first periodic electrical signal to a second periodic electrical signal at an elevated frequency greater than the base frequency;
    an optical source configured to convert the second periodic electrical signal to a third periodic optical signal at the elevated frequency;
    an optical amplifier configured to amplify the third periodic optical signal to produce a fourth periodic optical signal at the elevated frequency; and
    an optical fiber configured to receive the fourth periodic optical signal and direct a respective sixth periodic optical signal to a remote unit,
    the remote unit comprising:
        an optical detector configured to receive the sixth periodic optical signal at the elevated frequency and produce a seventh periodic electrical signal at the elevated frequency; and
        a frequency divider configured to receive the seventh periodic electrical signal at the elevated frequency and produce an eighth periodic electrical signal at the base frequency.

2. The system of claim 1, further comprising:
    a signal generator configured to produce the first periodic electrical signal at the base frequency.

3. The system of claim 1, wherein the optical source is a laser diode having a wavelength between 1525 nm and 1565 nm.

4. The system of claim 3, wherein the laser diode is directly modulated in response to the second periodic electrical signal.

5. The system of claim 3, wherein the laser diode is externally modulated in response to the second periodic electrical signal.

6. The system of claim 1, wherein the optical amplifier is an erbium doped fiber amplifier.

7. An analog, fiber-based signal distribution system, comprising:
    a frequency multiplier configured to receive a first periodic electrical signal at a base frequency and convert the first periodic electrical signal to a second periodic electrical signal at an elevated frequency greater than the base frequency;
    an optical source configured to convert the second periodic electrical signal to a third periodic optical signal at the elevated frequency;
    an optical amplifier configured to amplify the third periodic optical signal to produce a fourth periodic optical signal at the elevated frequency;
    an optical splitter configured to split the fourth periodic optical signal into a plurality of fifth periodic optical signals; and
    a plurality of optical fibers, each optical fiber configured to receive a respective fifth periodic optical signal and direct a respective sixth periodic optical signal to a respective remote unit, each remote unit comprising:
- an optical detector configured to convert the sixth periodic optical signal to a seventh periodic electrical signal at the elevated frequency; and
- a frequency divider configured to receive the seventh periodic electrical signal at the elevated frequency and produce an eighth periodic electrical signal at the base frequency;

wherein the eighth periodic signals of the remote units are all synchronized.

8. The system of claim 7, further comprising a signal generator configured to produce the first periodic electrical signal at the base frequency.

9. The system of claim 7,
wherein the optical source is a laser diode having a wavelength between 1525 nm and 1565 nm; and
wherein the optical amplifier is an erbium doped fiber amplifier.

10. A method for transmitting a signal, comprising:
increasing the frequency of a first periodic electrical signal at a base frequency to an elevated frequency to form a second periodic electrical signal;
converting the second periodic electrical signal at the elevated frequency to a third periodic optical signal at the elevated frequency;
amplifying the third periodic optical signal at the elevated frequency to form a fourth periodic optical signal at the elevated frequency;
transmitting via optical fiber the fourth periodic optical signal at the elevated frequency to form a fifth periodic optical signal at the elevated frequency;
receiving the fifth periodic optical signal at the elevated frequency to form a sixth periodic optical signal at the elevated frequency;
converting the sixth periodic optical signal at the elevated frequency to a seventh periodic electrical signal at the elevated frequency;
reducing the frequency of the seventh periodic electrical signal to the base frequency to form an eighth periodic electrical signal.

11. The method of claim 10, wherein the eighth periodic electrical signal is a clock signal.

12. The method of claim 11,
wherein the eighth periodic electrical signal is a sinewave; and further comprising:

generating a clock signal at the base frequency from the eighth periodic electrical signal.

13. The method of claim 12, wherein the clock signal is a pulse having a rising edge that corresponds to a zero-crossing of the eighth periodic electrical signal.

14. The method of claim 10, wherein the first periodic electrical signal, the second periodic electrical signal, the third periodic optical signal, the fourth periodic optical signal, the fifth periodic optical signal, the sixth periodic optical signal, the seventh periodic electrical signal, and the eighth periodic electrical signal are all sinusoidal.

15. The method of claim 10, wherein the elevated frequency is an integral multiple of the base frequency.

16. The method of claim 10, wherein the third, fourth, fifth, and sixth periodic optical signals all have a common wavelength between 1525 nm and 1565 nm.

17. The method of claim 16, wherein amplifying the third periodic optical signal at the elevated frequency to form a fourth periodic optical signal at the elevated frequency comprises:
transmitting the third periodic optical signal through an erbium doped fiber amplifier to form the fourth periodic optical signal.

18. The method of claim 10, wherein amplifying the third periodic optical signal at the elevated frequency to form a fourth periodic optical signal at the elevated frequency comprises:
transmitting the third periodic optical signal through an erbium doped fiber amplifier to form an amplified periodic optical signal;
splitting the amplified periodic optical signal to form a plurality of split periodic optical signals; and
selecting one of the plurality of split periodic optical signals to be the fourth periodic optical signal.

19. The method of claim 10, wherein transmitting the fourth periodic optical signal at the elevated frequency to form a fifth periodic optical signal at the elevated frequency comprises:
propagating the fourth periodic signal along a length of single-mode optical fiber.

20. The method of claim 10, further comprising:
filtering the frequencies of the seventh periodic electrical signal to a passband that includes the elevated frequency.

* * * * *